(12) United States Patent
Wagner et al.

(10) Patent No.: US 10,767,637 B2
(45) Date of Patent: Sep. 8, 2020

(54) SCALABLE AND ECONOMIC SOLID-STATE THERMOKINETIC THRUSTER

(71) Applicants: Sean Preston Wagner, Edmonton (CA); Thomas Thundat, Buffalo, NY (US)

(72) Inventors: Sean Preston Wagner, Edmonton (CA); Thomas Thundat, Buffalo, NY (US)

( * ) Notice: Subject to any disclaimer, the term of this patent is extended or adjusted under 35 U.S.C. 154(b) by 176 days.

(21) Appl. No.: 15/923,496

(22) Filed: Mar. 16, 2018

(65) Prior Publication Data

US 2018/0266404 A1 Sep. 20, 2018

Related U.S. Application Data

(60) Provisional application No. 62/473,086, filed on Mar. 17, 2017.

(51) Int. Cl.
| | |
|---|---|
| *F03G 7/00* | (2006.01) |
| *F03G 6/00* | (2006.01) |
| *F03H 99/00* | (2009.01) |

(52) U.S. Cl.
CPC ............. *F03H 99/00* (2013.01); *F03G 7/005* (2013.01); *F03G 6/00* (2013.01)

(58) Field of Classification Search
CPC ............. F03H 99/00; F03G 7/005; F03G 6/00
See application file for complete search history.

(56) References Cited

U.S. PATENT DOCUMENTS

| | | | | |
|---|---|---|---|---|
| 4,410,805 A | * | 10/1983 | Berley | ............. F03G 7/005 290/1 R |
| 8,596,572 B1 | * | 12/2013 | Kirshman | ........... B64C 39/00 244/34 R |
| 9,372,016 B2 | * | 6/2016 | Bloedow | ............. F25B 21/02 |
| 9,728,699 B2 | * | 8/2017 | Zonenberg | ........... F04B 19/006 |
| 9,863,364 B2 | * | 1/2018 | Garbuz | ............. F02G 1/043 |
| 2006/0000215 A1 | * | 1/2006 | Kremen | ............. F03G 6/00 60/721 |
| 2006/0001569 A1 | * | 1/2006 | Scandurra | .......... B63H 19/00 342/351 |
| 2017/0183772 A1 | * | 6/2017 | Bargatin | ............. C23C 16/01 |

* cited by examiner

*Primary Examiner* — Michael C Zarroli

(57) ABSTRACT

This patent seeks to describe a design and method of production of a solid state radiometric thruster for the intent of producing a new method of powered flight at varying scales of operation. By using modern nano-manufacturing techniques it is possible to create surface microstructures of the same size as the mean free path for gases at any desired operational pressure, allowing for radiometric forces to be harnessed for propulsion even when the total part dimensions are several orders of magnitude larger than would normally allow this effect to create a noticeable force.

1 Claim, 6 Drawing Sheets

SCALABLE AND ECONOMIC SOLID-STATE THERMOKINETIC THRUSTER

BACKGROUND

The current methods of producing motion for vehicles, aside from rockets, involves the conversion of rotational energy into linear motion through complex mechanical systems or the use of high speed electric motors. These systems involve many moving parts and points of contact that wear away, limit their lifespans, and enforce maintenance schedules that increase the operating costs of the equipment. This patent shows a method of producing unidirectional thrust with no moving parts from a solid state, perforated plate immersed in a gaseous working fluid. To date no device has been designed capable of exploiting the radiometric effect at standard temperature and pressure (STP) conditions that is not prohibitively expensive to fabricate. Current designs either require membranes that are too thin to withstand moderate forces applied to it (Scandurra, Radiometric propulsion system 2006), or the absolute precise stacking of multiple layers at scales below what is currently attainable with overly complicated heating and cooling systems that are not currently feasible with even modem complementary metal-oxide semiconductor (CMOS) processing (Sanchez, Garbuz and Zonenberg 2014). The invention described within provides a way of crafting a simple system that is currently producible, capable of exerting useful amounts of force, and able to be an arbitrary thickness, which allows for robust parts to be used.

SUMMARY OF INVENTION

This invention uses the radiometric effect to produce thrust by creating a momentum imbalance between two differentially heated surfaces of a single object. By creating a difference in the surface temperatures between two faces of a plate it is possible to create a momentum imbalance resulting from the differing rebound energies of gas molecules that interact with either side of the plate. The controlling feature is there must be a locus on the plate where the distance between the hot and cold coatings of the plate are within a single mean free path of each other with respect to the ambient gas. Without this locus, the gas molecules begin to act in accordance with macroscale phenomena and standard thermodynamics, only allowing the gases to transfer energy in the forms of heat and momentum in the direction from the hot side towards the cold side. When the feature size of the invention is below the mean free path, however, gas molecules can transfer heat and momentum in any direction with no external input of energy, allowing some molecules to move from an area of low temperature to an area of high temperature gaining energy in the process. The gas molecules experience an energy gain from their interactions with the device in this manner due to a "random walk" motion against the temperature gradient. Thus, in order to conserve momentum, the device must have a force exerted on it in the opposite direction of motion. This momentum transfer is the underlying principle of the radiometric effect and is the method of producing a unidirectional thrust for this invention.

DETAILED DESCRIPTION AND BEST MODE OF IMPLEMENTATION

The optimum embodiment is comprised of five main components. The first component is the active component and could be a membrane, block, strip, or volume which is comprised of a material with regularly spaced surface openings on opposite surfaces, and a porous internal structure that penetrates through the entire cross-sectional length of the component connecting the surface pores to each other through either linear or randomly oriented pores.

The second component is the initial thermal coating layer, hereafter referred to as the "cooling coating". The cooling coating is a coating of uniform thickness created by any manner of controllable and uniform deposition process (eg. Low-pressure CVD, Atomic Layer Deposition, electroless deposition etc.). The material of the coating is any high thermal conductivity material (eg. copper, silver, diamond, graphene etc.) or any catalyst material that can be used to grow one of the previously alluded preferred material types at a later stage of processing. This coating uniformly coats one surface and the majority of the interior of the porous structure of the active component. The purpose of this coating is so that active cooling systems can be applied to it to maintain a suppressed temperature of any gases flowing through the pores until they leave contact with the interior surface of the pores.

Figure 3:
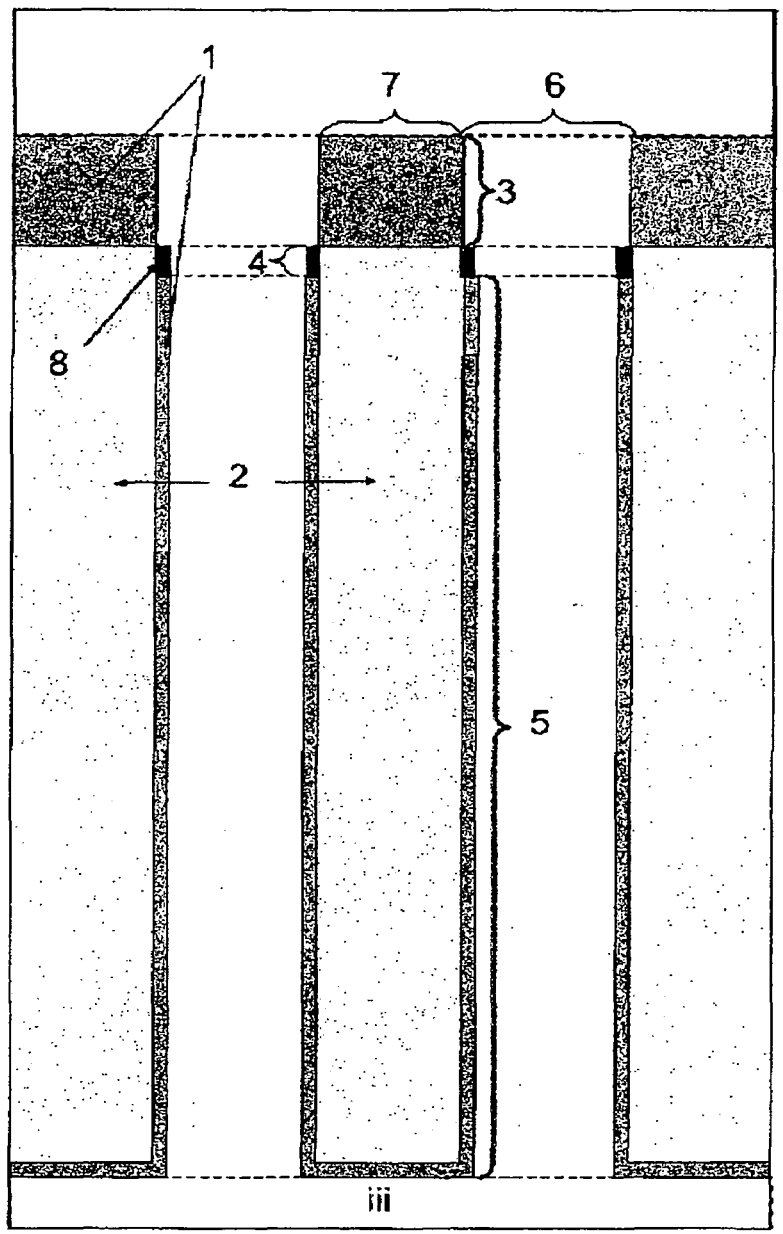
FIG. 3 shows an embodiment similar to the first except there is a thermal barrier material coating applied between the hot and cold coatings.
Figure 4:
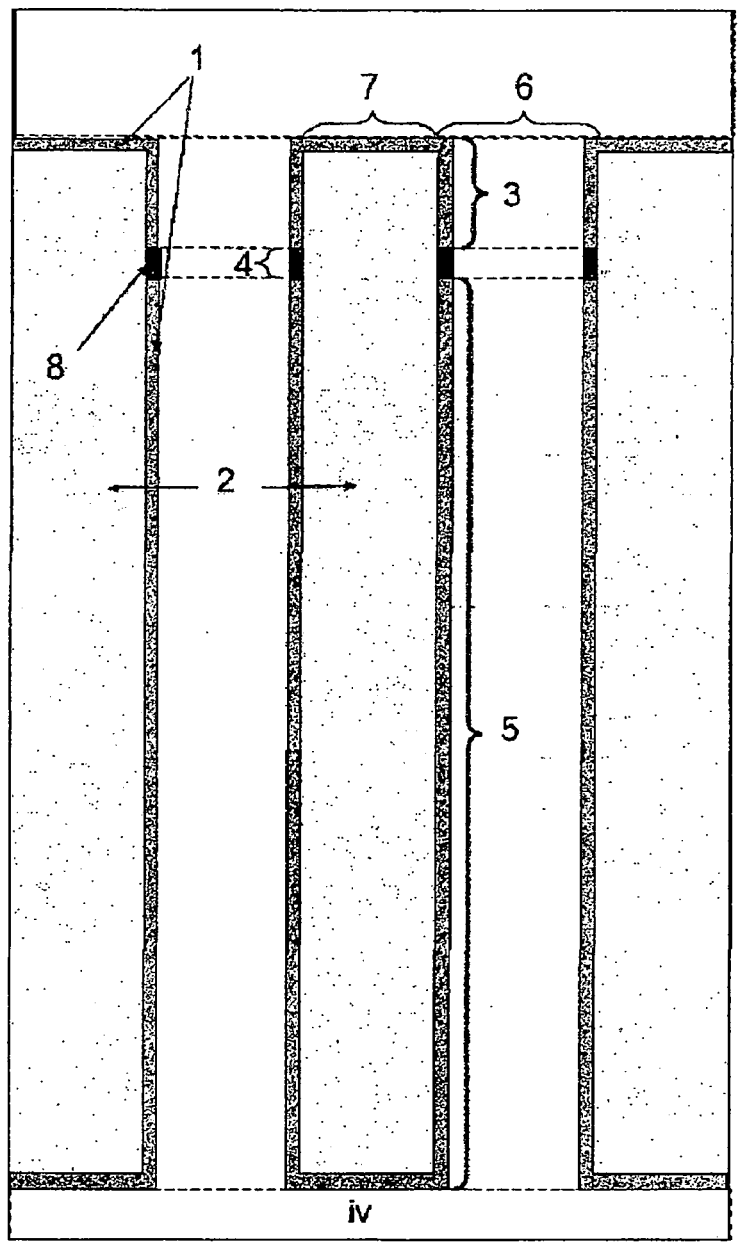
FIG. 4 shows an embodiment similar to the second embodiment, except there is a thermal barrier coating applied between the hot and cold coatings each
Figure 5:
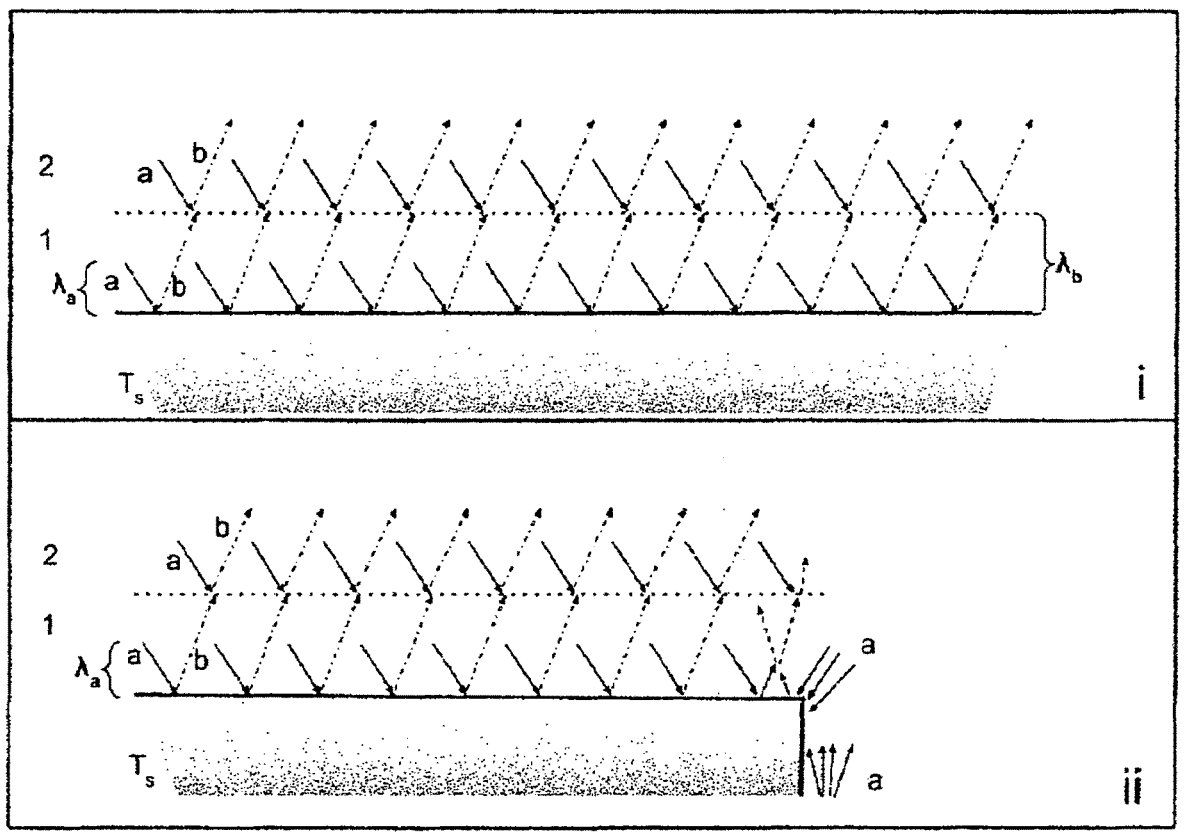
FIG. 5 presents a schematic of how the difference between the mean free paths of two different populations of gas molecules interacting at the edge of a radiometer compares to gas molecules on a flat surface at identical temperatures. When the population of air coming up the edge has a smaller mean free path, it allows more gas molecules to interact with the surface around the edge and thus promotes momentum transfer between the gas and the device. When the surface is continuous, the gas molecules that rebound from the surface act to prevent more of the incoming gas molecules from interacting with the surface thus preventing more interactions.

The third component is the counterpart to the cooling coating and it is a similar coating on the opposite face of the device. This coating is meant to be heated above ambient temperatures, how much above depending on the thermal characteristics of the coating material, and active component material. The coating is deposited via any physical or chemical deposition methods (eg. Sputtering, chemical vapour deposition, electrochemical deposition etc.) so that the coating either rests on top and outside of every pore as shown in Embodiments i and iii in FIGS. 1 and 3, or only extend down the pores for a known and controllable distance as shown in embodiments ii and iv in FIGS. 2 and 4. The material of this coating is most likely identical to that of the cooling coating but could be comprised of extra layers of materials with differing thermal conductivities to create a Thermal Barrier Membrane (TBM) between the heated surface and the structural material of the active component and holder frame.

Figure 1:
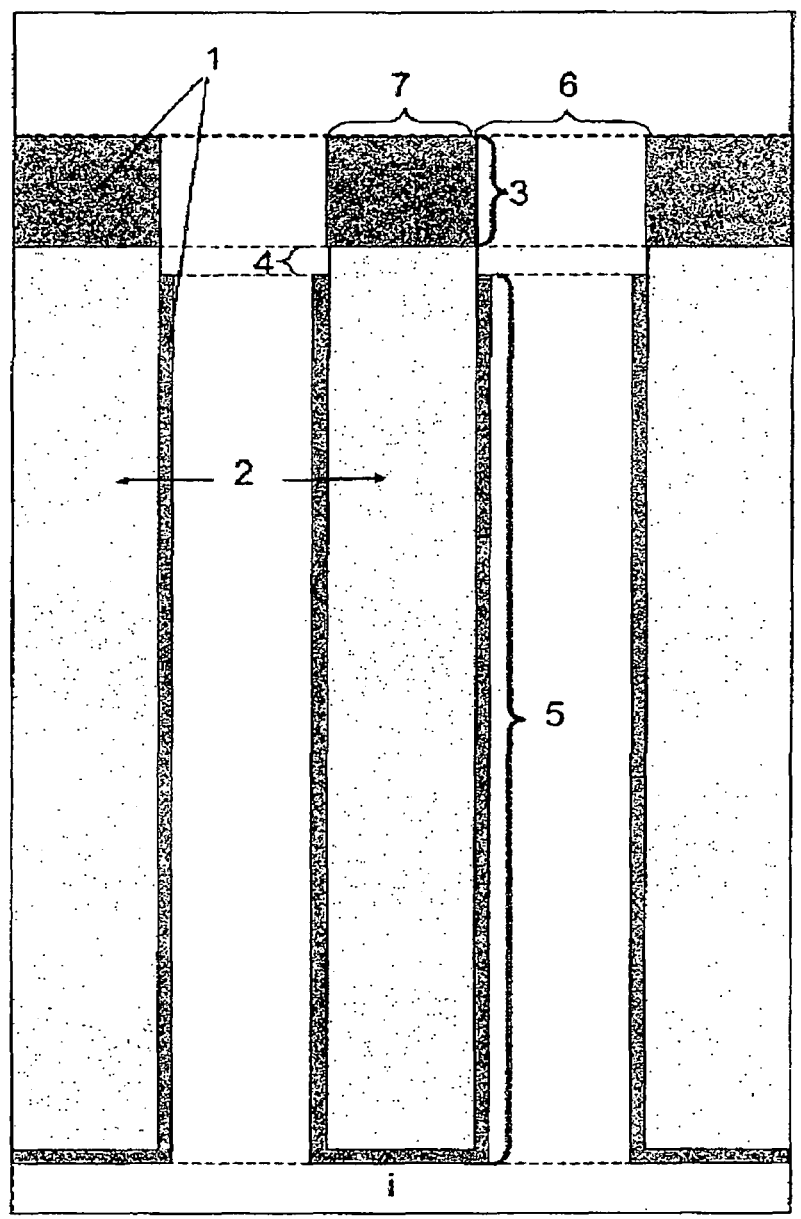
FIG. 1 shows one embodiment of the thermal coating films on the porous surface of the device where the heating coating is only applied outside of the pores of the membrane.
Figure 2:
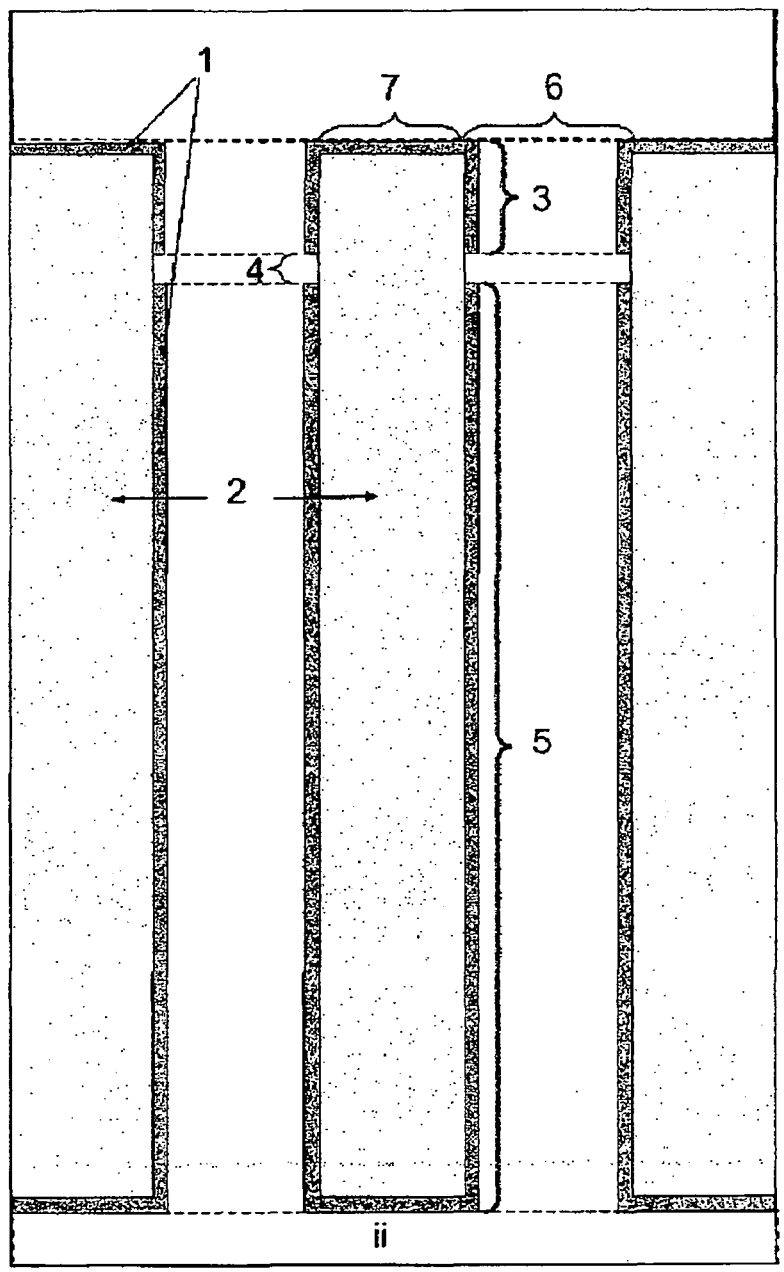
FIG. 2 shows another embodiment of the thermal coating films on the porous surface of the device where the heating coating is applied conformably to the "upper" portions of the membrane and extends for a certain distance "down" each pore.

The fourth and most important component of this design is the Thermal Boundary between the cooling and heating coatings. This boundary can be created either by using a gap in the coatings as shown in the embodiments of FIGS. 1 and 2, or by the addition of a specific material coating with a very low thermal conductivity as shown in the embodiments in FIGS. 3 and 4. The boundary allows for these coatings to be differentially heated and not only dramatically reduce the rate of heat transfer between the two coatings, but also to allow the effective temperature gradient of the membrane to approach the magnitude of Kelvin per nanometer. With this magnitude of thermal gradient between these locations of the active component, it Is possible to dramatically improve the magnitude of the momentum gain of transient gas molecules travelling between the cooling and heating coatings. As well, by using a boundary between heated surfaces rather than a standard edge of a plate or other surface, it is possible to use an active component of indeterminate thickness, allowing for robust thrusters to be produced.

The width/thickness of the barrier may be designed for a specific range of operational pressures. For example, the lower the planned pressure for the thruster the larger the barrier can be due to the increase of the ambient gases mean free path. Ideally, the combined distance of the barrier and the depth of the heating coating should be equal to or less than the mean free path of the ambient gas at operational pressures.

The final component of the invention is the power systems, comprising any set of or combination of systems such as mechanical (eg. radiators, heat pipes, heat pumps), chemical (eg. combustion reactions, or any form of controllable endo- or exothermic reaction) or electrical (eg. peltier coolers, thermionic coolers, resistive heaters, induction heating), which will be used to regulate the surface temperatures of both the heating and cooling coatings individually. By controlling the magnitude of the temperature differential between the hot and cold faces of the device the scale of the momentum imbalance can be tuned to provide varying levels of thrust for different situations.

Figure 6:
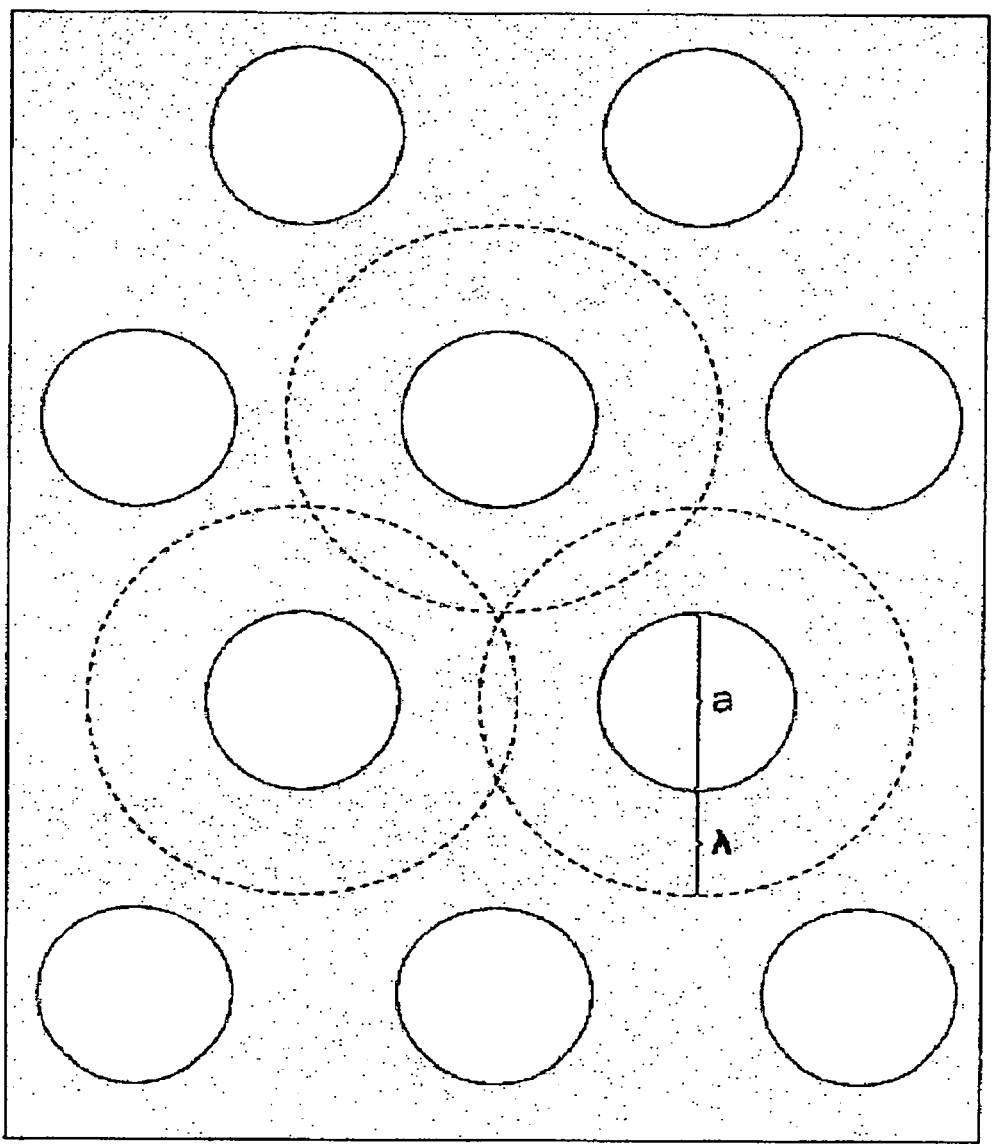
FIG. 6 shows how the active areas around each pore should overlap to maximize the useful area for producing thrust in a hexagonally close-packed array of circular pores.

The reason for creating a device based around a porous material is that the radiometric effect is primarily due to differences in how two populations of gases interact when their mean free paths are different. In standard radiometers, with solid flat vanes, the momentum transfer happens only at the edge, as that is the only location that separate populations of gas molecules with different mean free paths can meet and interact. Thus by using a material with a large number of regularly spaced and arranged holes it is possible to create not only a much larger amount of edge space for a given size of sample but also to maximize the efficiency of the amount of surface area treated as active in the momentum transfer between the gases and device. The ideal spacing for the pores is such that after deposition of the heated coating the pores of the hot side will be slightly smaller than the mean free path of the ambient gas molecules. The spacing of the pores will be such that the active area surrounding each pore, an annulus of width equivalent to approximately one mean free path of a gas molecule, overlaps with the active areas of all other nearby pores such that there is no available surface not covered by these annuli as shown in FIG. 6. The active area described is in reference to Albert Einstein's description of the mechanism behind the radiometric effect (Einstein 1924), where the only portion of the surface of a vane that is being acted upon by the radiometric effect is a strip on both sides of an edge extending a distance of one mean free path of the surrounding gases from the edge. By using a hexagonally packed array of pores and following this design parameter the ideal membrane should have approximately 12% porosity compared to Scandurra's assumption (Scandurra 2004) that a 50% porosity would provide maximized thrust.

Since this invention requires a power source to create the temperature difference between the two faces there must be separate mechanisms for both the cold and hot faces to achieve their desired temperatures. This helps to prevent thermal shock upon starting the operation of the invention as the thermal gradient growth can be controlled so as not to cause damage to the device by ramping up the power too quickly for the material to adapt. For example with pure alumina as the active component material it would be inadvisable to increase the thermal difference faster than approximately 5 degrees Celsius per minute and for safety of operation the maximum temperature differential between the hot and cold faces should be approximately 60 degrees Celsius for a 100 micron thick component. Other materials would perform differently and would possibly have better thermal resilience.

WORKS CITED

Einstein, Albert. 1924. "Theory of radiometer energy source." *Z. Phys* 27 1-6.

Sanchez, Jason D., Piotr A. Garbuz, and Andrew D. Zonenberg. 2014. Nanomolecular solid state electrodynamic thruster. United States of America Patent U.S. Pat. No. 8,794,930 B2. August 5.

Scandurra, Marco. 2004. "Enhanced Radiometric Forces." *Technology*.

Scandurra, Marco. 2006. Radiometric propulsion system. United States of America Patent US 20060001569 A1. January 5.

The invention claimed is:

1. A solid-state device capable of creating unidirectional thrust based off the principles of the radiometric effect, being comprised of:
   a. A porous plate structure of any thickness between 10 nm and 100 mm and comprising of at least two major surfaces defined as a surface that comprises between 15-50% of the external surface area of the device;
   b. The pores on each major surface being of a regular patterning or a random arrangement, such that each pore on each surface is connected to at least one other pore on the opposing major surface, with the smallest dimension of said pores in the plane of the major surfaces being between 0.5-10 times the length of the Mean Free Path of the gas in which the device is to operate;
   c. A coating of uniform thickness, between 2-20 nm, of thermally conductive material, or catalytic material for the growth of thermally conductive material in a subsequent step, on one of the major surfaces and continuing through the majority of the thickness of the pores;
   d. A coating of uniform thickness, between 2-100 nm, of thermally conductive material, or catalytic material, for the growth of thermally conductive material in a subsequent step, on the opposite major surface and extending a distance between 1-10 times that of the Mean Free Path of the gas in which a thruster is to operate, down each pore from said major surface;

e. A gap, or a thermally non-conductive material coating, measuring a distance equal to that of the Mean Free Path of the gas the device is designed to be operating in, plus or minus 50% of the length of the Mean Free Path, between the coatings of uniform, but with potentially different thickness.

* * * * *